US012641275B2

(12) United States Patent
Liu et al.

(10) Patent No.: US 12,641,275 B2
(45) Date of Patent: May 26, 2026

(54) METHOD, DEVICE, AND COMPUTER PROGRAM PRODUCT FOR COMPRESSING POINT CLOUD DATA

(71) Applicant: Dell Products L.P., Round Rock, TX (US)

(72) Inventors: Zhisong Liu, Shenzhen (CN); Zijia Wang, London (GB); Bin He, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 18/678,691

(22) Filed: May 30, 2024

(65) Prior Publication Data

US 2025/0337942 A1     Oct. 30, 2025

(30) Foreign Application Priority Data

Apr. 26, 2024     (CN) .......................... 202410516551.7

(51) Int. Cl.
*H04N 19/513*          (2014.01)
*G06N 3/0455*          (2023.01)
(Continued)

(52) U.S. Cl.
CPC ......... *H04N 19/513* (2014.11); *G06N 3/0455* (2023.01); *G06N 3/0464* (2023.01);
(Continued)

(58) Field of Classification Search
CPC .... H04N 19/513; H04N 19/91; H04N 19/597; H04N 19/159; H04N 19/124;
(Continued)

(56) References Cited

U.S. PATENT DOCUMENTS

2017/0347120 A1*  11/2017  Chou ..................... H04N 19/51
2018/0255318 A1*   9/2018  Xu ....................... H04N 19/521
(Continued)

OTHER PUBLICATIONS

R. Mekuria et al., "Design, Implementation, and Evaluation of a Point Cloud Codec for Tele-Immersive Video," IEEE Transactions on Circuits and Systems for Video Technology, 2017, vol. 27, No. 4, pp. 828-842. (Year: 2017).*

(Continued)

*Primary Examiner* — Emily C Terrell
*Assistant Examiner* — Daniella M. DiGuglielmo
(74) *Attorney, Agent, or Firm* — Ryan, Mason & Lewis, LLP

(57)          ABSTRACT

A method includes generating an intra-frame point cloud and an inter-frame point cloud based on point cloud data that includes a plurality of point cloud frames. The method further includes generating a motion vector associated with the intra-frame point cloud based on the intra-frame point cloud and the inter-frame point cloud. The method further includes generating a compressed inter-frame point cloud based on the inter-frame point cloud by using an encoder module of an autoencoder network. In addition, the method further includes generating compressed point cloud data based on the motion vector and the compressed inter-frame point cloud. According to solutions of embodiments of the present disclosure, the point cloud data can be compressed through a down-sampling convolution layer of the encoder module, and a correlation between the point cloud data can be captured by combining cross-attention layers, resulting in improved compression ratio, compression accuracy and point cloud data quality.

20 Claims, 8 Drawing Sheets

(51) Int. Cl.

| | |
|---|---|
| *G06N 3/0464* | (2023.01) |
| *G06N 3/08* | (2023.01) |
| *H04N 19/124* | (2014.01) |
| *H04N 19/13* | (2014.01) |
| *H04N 19/159* | (2014.01) |
| *H04N 19/436* | (2014.01) |
| *H04N 19/53* | (2014.01) |
| *H04N 19/597* | (2014.01) |
| *H04N 19/91* | (2014.01) |

(52) U.S. Cl.
CPC ............... *G06N 3/08* (2013.01); *H04N 19/13* (2014.11); *H04N 19/159* (2014.11); *H04N 19/436* (2014.11); *H04N 19/597* (2014.11); *H04N 19/91* (2014.11); *H04N 19/124* (2014.11); *H04N 19/53* (2014.11)

(58) Field of Classification Search
CPC ...... H04N 19/13; H04N 19/436; H04N 19/53; G06N 3/0455; G06N 3/0464; G06N 3/08
See application file for complete search history.

(56) References Cited

U.S. PATENT DOCUMENTS

| | | | | |
|---|---|---|---|---|
| 2019/0124347 A1* | 4/2019 | Stolt | .................... | H04N 19/147 |
| 2024/0062428 A1* | 2/2024 | Oh | ........................ | H04N 19/597 |

OTHER PUBLICATIONS

A. Akhtar et al., "Inter-Frame Compression for Dynamic Point Cloud Geometry Coding," arXiv, 2022, pp. 1-9. (Year: 2022).*

S.-B. Park et al., "Multiscale Representation and Compression of 3-D Point Data," IEEE Transactions on Multimedia, vol. 11, Jan. 2009, pp. 177-183.

V. Morell et al., "Geometric 3D point Cloud Compression," Pattern Recognition Letters, vol. 50, Dec. 2014, 17 pages.

Z. Que et al., "VoxelContext-Net: An Octree Based Framework for Point Cloud Compression," IEEE/CVF Conference on Computer Vision and Pattern Recognition, Jun. 2021, pp. 6042-6051.

T. Huang et al., "3QNet: 3D Point Cloud Geometry Quantization Compression Network," ACM Transactions on Graphics, vol. 37, No. 4, Article 187, Aug. 2022, 13 pages.

W. Yan et al., "Deep AutoEncoder-based Lossy Geometry Compression for Point Clouds," arXiv:1905.03691v1, Apr. 18, 2019, pp. 4321-4328.

T. Huang et al., "3D Point Cloud Geometry Compression on Deep Learning," Proceedings of the 27th ACM International Conference on Multimedia, Oct. 2019, pp. 890-898.

L. Huang et al., "OctSqueeze: Octree-Structured Entropy Model for Li-DAR Compression," 2020 IEEE/CVF Conference on Computer Vision and Pattern Recognition (CVPR), Jun. 2020, pp. 1313-1323.

S. Biswas et al., "MuSCLE: Multi Sweep Compression of LiDAR Using Deep Entropy Models," 34th Conference on Neural Information Processing Systems, Dec. 2020, 12 pages.

C. Tu et al., "Real-Time Streaming Point Cloud Compression for 3D LiDAR Sensor Using U-Net," IEEE Access, vol. 7, Aug. 14, 2019, pp. 113616-113625.

Y. Li et al., "PointCNN: Convolution On X-Transformed Points," Advances in Neural Information Processing Systems, Dec. 2018, 11 pages.

S. Liu et al., "Learning a Hierarchical Latent-Variable Model of 3D Shapes," arXiv:1705.05994v4, Aug. 4, 2018, 10 pages.

R. B. Rusu et al., "3D is here: Point Cloud Library (PCL)," 2011 IEEE International Conference on Robotics and Automation, May 2011, 4 pages.

J. Balle et al., "End-to-end Optimized Image Compression," International Conference on Learning Representations, arXiv:1611.01704v3, Mar. 3, 2017, 27 pages.

J. Behley et al., "SemanticKITTI: A Dataset for Semantic Scene Understanding of LiDAR Sequences," IEEE/CVF International Conference on Computer Vision (ICCV), Oct. 2019, pp. 9297-9307.

D. Graziosi et al., "An Overview of Ongoing Point Cloud Compression Standardization Activities: Video-based (V-PCC) and Geometry-based (GPCC)," Apsipa Transactions on Signal and Information Processing, vol. 9, Apr. 2020, 17 pages.

Github, "Google/Draco," https://github.com/google/draco, Accessed May 16, 2024, 15 pages.

R. Mekuria et al., "Design, Implementation, and Evaluation of a Point Cloud Codec for Tele-Immersive Video," IEEE Transactions on Circuits and Systems for Video Technology, vol. 27, No. 4, Apr. 2017, 14 pages.

J. Wang et al., "Lossy Point Cloud Geometry Compression via End-to-End Learning," IEEE Transactions on Circuits and Systems for Video Technology, vol. 31, No. 12, Dec. 2021, pp. 4909-4923.

* cited by examiner

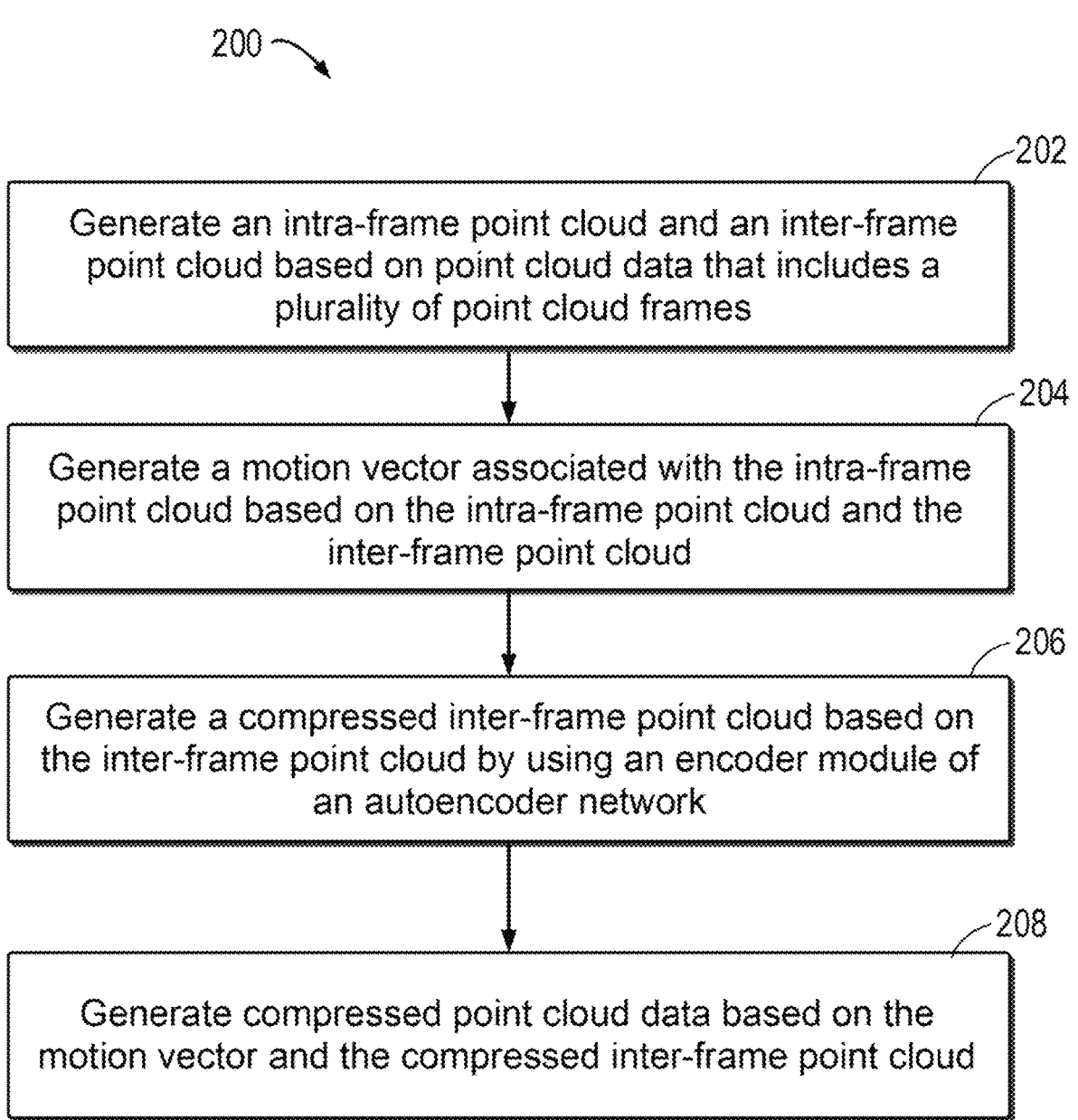

200

202
Generate an intra-frame point cloud and an inter-frame point cloud based on point cloud data that includes a plurality of point cloud frames 204
Generate a motion vector associated with the intra-frame point cloud based on the intra-frame point cloud and the inter-frame point cloud 206
Generate a compressed inter-frame point cloud based on the inter-frame point cloud by using an encoder module of an autoencoder network 208
Generate compressed point cloud data based on the motion vector and the compressed inter-frame point cloud

METHOD, DEVICE, AND COMPUTER PROGRAM PRODUCT FOR COMPRESSING POINT CLOUD DATA

RELATED APPLICATION

The present application claims priority to Chinese Patent Application No. 202410516551.7, filed Apr. 26, 2024, and entitled "Method, Device, and Computer Program Product for Compressing Point Cloud Data," which is incorporated by reference herein in its entirety.

FIELD

Embodiments of the present disclosure relate to the field of computers, and in particular to a method, apparatus, device, and computer program product for compressing point cloud data.

BACKGROUND

Point cloud data is a three-dimensional dataset composed of a large quantity of discrete points, each of which has spatial coordinate information. It is usually used to describe the shape and structure of an object's surface or scene, such as terrain, buildings, vehicles, and so on. The point cloud data may be obtained through various sensors (e.g., Light Detection and Ranging (LiDAR), cameras, etc.) and is widely used in fields such as map making, three-dimensional reconstruction, autonomous driving, and virtual reality.

Point cloud data therefore plays a key role in many fields. Through point cloud data, accurate three-dimensional reconstruction, target recognition, and trajectory planning can be carried out to help people better understand and utilize spatial information. In addition, point cloud data further provides a foundation for interactive applications such as virtual reality and augmented reality, and promotes the development and progress of the digital age.

SUMMARY

Embodiments of the present disclosure provide a method, device, and computer program product for compressing point cloud data.

According to one aspect of the present disclosure, a method is provided. The method includes generating an intra-frame point cloud and an inter-frame point cloud based on point cloud data that includes a plurality of point cloud frames. The method further includes generating a motion vector associated with the intra-frame point cloud based on the intra-frame point cloud and the inter-frame point cloud. The method further includes generating a compressed inter-frame point cloud based on the inter-frame point cloud by using an encoder module of an autoencoder network, where the encoder includes a plurality of down-sampling convolution layers for compression and a plurality of cross-attention layers for capturing a correlation between the plurality of point cloud frames. In addition, the method further includes generating compressed point cloud data based on the motion vector and the compressed inter-frame point cloud.

According to another aspect of the present disclosure, an electronic device is provided. The electronic device includes at least one processor and a memory coupled to the at least one processor and having instructions stored therein. The instructions, when executed by the at least one processor, cause the electronic device to perform actions comprising:

generating an intra-frame point cloud and an inter-frame point cloud based on point cloud data that includes a plurality of point cloud frames; generating a motion vector associated with the intra-frame point cloud based on the intra-frame point cloud and the inter-frame point cloud; generating a compressed inter-frame point cloud based on the inter-frame point cloud by using an encoder module of an autoencoder network, wherein the encoder includes a plurality of down-sampling convolution layers for compression and a plurality of cross-attention layers for capturing a correlation between the plurality of point cloud frames; and generating compressed point cloud data based on the motion vector and the compressed inter-frame point cloud.

According to still another aspect of the present disclosure, a computer program product is provided. The computer program product is tangibly stored on a non-transitory computer-readable medium and comprises machine-executable instructions. The machine-executable instructions, when executed by a machine, cause the machine to perform actions comprising: generating an intra-frame point cloud and an inter-frame point cloud based on point cloud data that includes a plurality of point cloud frames; generating a motion vector associated with the intra-frame point cloud based on the inter-frame point cloud and the inter-frame point cloud; generating a compressed inter-frame point cloud based on the inter-frame point cloud by using an encoder module of an autoencoder network, wherein the encoder module comprises a plurality of down-sampling convolution layers for compression and a plurality of cross-attention layers for capturing a correlation between the plurality of point cloud frames; and generating compressed point cloud data based on the motion vector and the compressed inter-frame point cloud.

This Summary is provided to introduce a selection of concepts in a simplified form, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of illustrative embodiments of the present disclosure, provided in more detail herein with reference to the accompanying drawings, the above and other objects, features, and advantages of the present disclosure will become more apparent. In the illustrative embodiments of the present disclosure, the same reference numerals generally represent the same elements, and in which:

FIG. 2 is a flow chart of a method for compressing point cloud data according to an embodiment of the present disclosure;

In various accompanying drawings, identical or corresponding reference numerals represent identical or corresponding parts.

DETAILED DESCRIPTION

Figure 1:
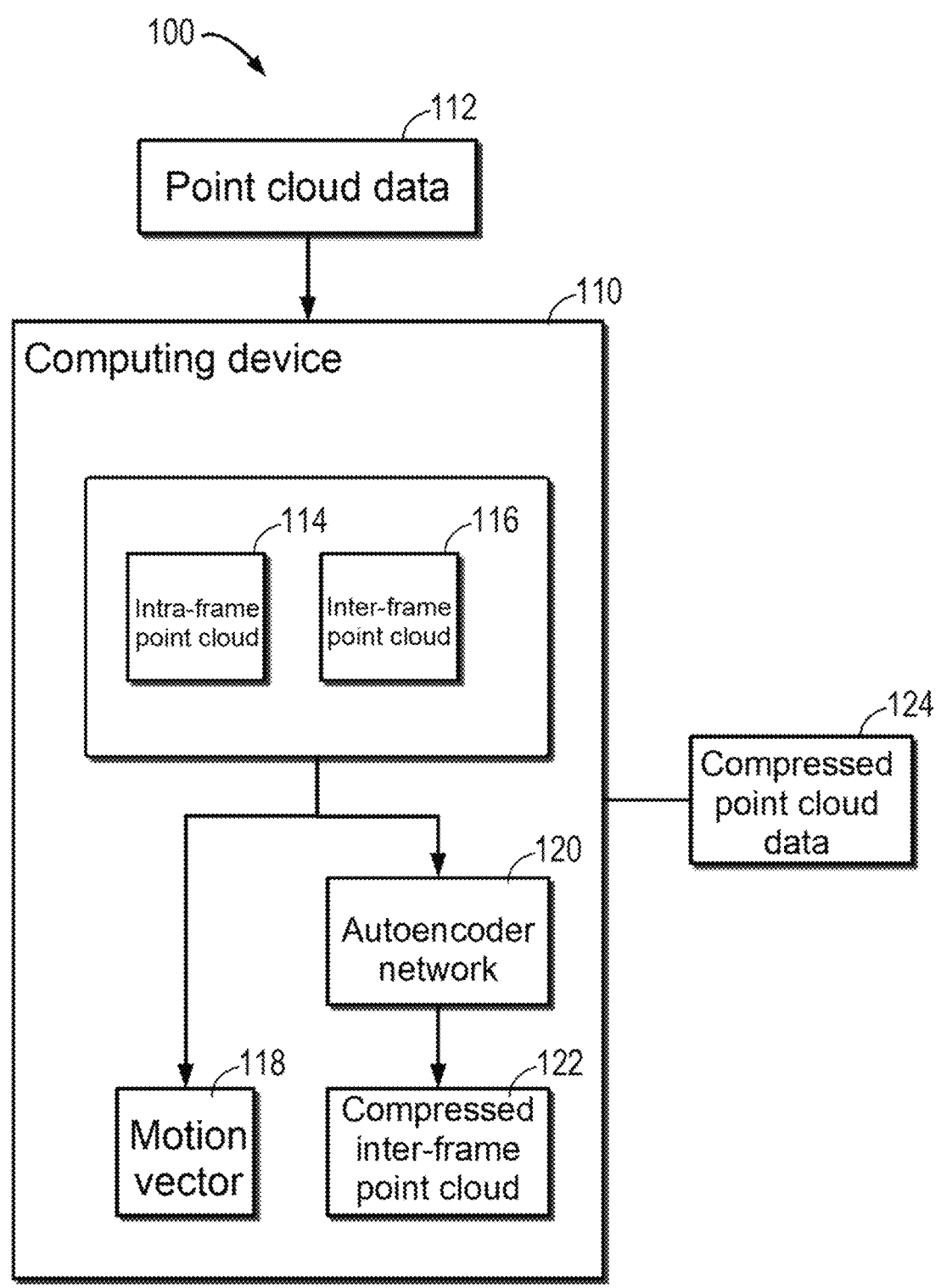
FIG. 1 is a schematic diagram of an example environment in which a device and/or a method according to an embodiment of the present disclosure may be implemented.

Illustrative embodiments of the present disclosure will be described in further detail below with reference to the accompanying drawings. While some specific embodiments of the present disclosure are shown in the accompanying drawings, it should be understood that the present disclosure may be implemented in various forms, and should not be construed as being limited to embodiments set forth herein. Rather, these embodiments are provided to make the present disclosure more thorough and complete and to fully convey the scope of the present disclosure to those skilled in the art.

The term "include" and variants thereof used herein indicate open-ended inclusion, namely, "including but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

As mentioned above, with the continuous advancement of technologies, point cloud data plays a crucial role in more and more fields, such as geographic information systems, intelligent transportation, medical imaging, and virtual reality, and provides important support and technological means to solve complex problems in the real world. However, due to the fact that point cloud data covers information from a three-dimensional world, the amount of data of the point cloud data is usually quite large. In order to efficiently store and use the data, a point cloud compression technology is utilized. The point cloud compression technology can reduce storage space requirements of data while maintaining accuracy and quality of the data, making processing and transmission of the point cloud data more efficient. Related point cloud compression technologies compress point cloud data through spatial partitioning or three-dimensional to two-dimensional projection, but do not explore a correlation between the point cloud data, resulting in a low compression ratio.

Therefore, embodiments of the present disclosure provide a point cloud data compression solution. First, point cloud data including a plurality of point cloud frames is divided into an intra-frame point cloud and an inter-frame point cloud, and a motion vector is generated based on the intra-frame point cloud and the inter-frame point cloud. An encoder of an autoencoder network is used to compress the inter-frame point cloud. Finally, compression of the point cloud data is completed by combining the motion vector and the compressed inter-frame point cloud.

Therefore, according to solutions of embodiments of the present disclosure, inter-frame point cloud data can be compressed through the encoder module of the autoencoder. The point cloud data is compressed through a down-sampling convolution layer of the encoder module, and a correlation between the point cloud data is captured by combining cross-attention layers. This not only improves a compression ratio of the point cloud data, but also ensures compression accuracy and quality of the point cloud data.

Basic principles and several example implementations of the present disclosure are described below with reference to FIG. 1 to FIG. 8. It should be understood that these illustrative embodiments are given only to enable those skilled in the art to better understand and thus implement embodiments of the present disclosure, and are not intended to limit the scope of the present disclosure in any way.

FIG. 1 shows an example environment 100 in which a device and/or a method according to an embodiment of the present disclosure may be implemented. As shown in FIG. 1, the example environment 100 includes a computing device 110, which may be a user terminal, a mobile device, a computer, or the like, and may also be a computing system, a single server, a distributed server, or a cloud-based server. The computing device 110 may receive point cloud data 112, which is a data form used to describe a surface of an object in three-dimensional space. The point cloud data 112 is composed of a large quantity of points, each of which has spatial coordinate information and other attributes such as color and normal vector. These points are arranged according to their positions in space to form the point cloud data 112. The point cloud data 112 is usually collected by a sensor like a LiDAR and is widely used in various fields such as geographic information systems, intelligent transportation, and virtual reality.

The point cloud data 112 is usually composed of a plurality of point cloud frames, each of which is a collection of point cloud data collected at different times or locations. These point cloud frames capture different viewing angles or states of the same scene, and by combining and analyzing these point cloud frames, more comprehensive and detailed three-dimensional information may be obtained. The computing device 110 may process the point cloud data 112, and generate an intra-frame point cloud 114 and an inter-frame point cloud 116. The intra-frame point cloud 114 may be a collection of point cloud data within the same point cloud frame, and the inter-frame point cloud 116 is a collection of point cloud data between different point cloud frames.

A motion vector 118 may be generated by comparing the intra-frame point cloud 114 and inter-frame point cloud 116. The motion vector 118 may indicate displacement of a current point cloud frame relative to a reference point cloud frame and describe movement and deformation of the point cloud data in space. In addition, through an encoder module of an autoencoder network 120, the inter-frame point cloud 116 may be compressed to generate a compressed inter-frame point cloud 122. The encoder module of the autoencoder network 120 may include down-sampling convolution layers for compression and cross-attention layers for capturing a correlation between the plurality of point cloud frames. Through the down-sampling convolution layers, the inter-frame point cloud 116 may be effectively compressed, thus reducing storage space occupation. For example, the inter-frame point cloud 116 may be dimensionally reduced through the down-sampling convolution layers. In addition, the cross-attention layers may capture the correlation between the plurality of point cloud frames to ensure that compressed data can still retain its important features and information.

As shown in FIG. 1, the computing device 110 may output compressed point cloud data 124 by combining the motion vector 118 and the compressed inter-frame point cloud 122. The compressed point cloud data 124 has significantly reduced data volume compared with that of the original point cloud data 112, and the ratio of reduction may be calculated based on the compression ratio. Therefore, in a use scenario involving point cloud data, after the point cloud data is obtained, the point cloud data may be compressed to generate compressed point cloud data, and then transmission, storage, and application of the point cloud data are performed. Through compression, the volume of the point cloud data may be reduced to improve data transmission efficiency and storage utilization while accelerating a data processing speed and an application response.

The foregoing describes, with reference to FIG. 1, an example environment 100 in which an embodiment of the present disclosure may be implemented. A flow chart of a method for compressing point cloud data according to an embodiment of the present disclosure will be described below with reference to FIG. 2.

FIG. 2 is a flow chart of a method 200 for compressing point cloud data according to an embodiment of the present disclosure. At block 202, an intra-frame point cloud and an inter-frame point cloud may be generated based on point cloud data that includes a plurality of point cloud frames. For example, as described with reference to FIG. 1, the computing device 110 may generate the intra-frame point cloud 114 and the inter-frame point cloud 116 based on the point cloud data 112 that includes a plurality of point cloud frames. At block 204, a motion vector associated with the intra-frame point cloud may be generated based on the intra-frame point cloud and the inter-frame point cloud. For example, as described with reference to FIG. 1, the computing device 110 may generate the motion vector 118 associated with the intra-frame point cloud 114 based on the intra-frame point cloud 114 and the inter-frame point cloud 116.

At block 206, a compressed inter-frame point cloud may be generated based on the inter-frame point cloud by using an encoder module of an autoencoder network, where the encoder includes a plurality of down-sampling convolution layers for compression and a plurality of cross-attention layers for capturing a correlation between the plurality of point cloud frames. For example, as described with reference to FIG. 1, the computing device 110 may generate the compressed inter-frame point cloud 122 based on the inter-frame point cloud 116 by using the encoder module of the autoencoder network 120. At block 208, compressed point cloud data is generated based on the motion vector and the compressed inter-frame point cloud. For example, as described with reference to FIG. 1, the computing device 110 may generate the compressed point cloud data 124 based on the motion vector 118 and the compressed inter-frame point cloud 122.

Therefore, according to the method 200 of embodiments of the present disclosure, inter-frame point cloud data can be compressed through an encoder module of an autoencoder. The point cloud data is compressed through a down-sampling convolution layer of the encoder module, and a correlation between the point cloud data is captured by combining cross-attention layers. This not only improves a compression ratio of the point cloud data, but also ensures compression accuracy and quality of the point cloud data.

Figure 3:
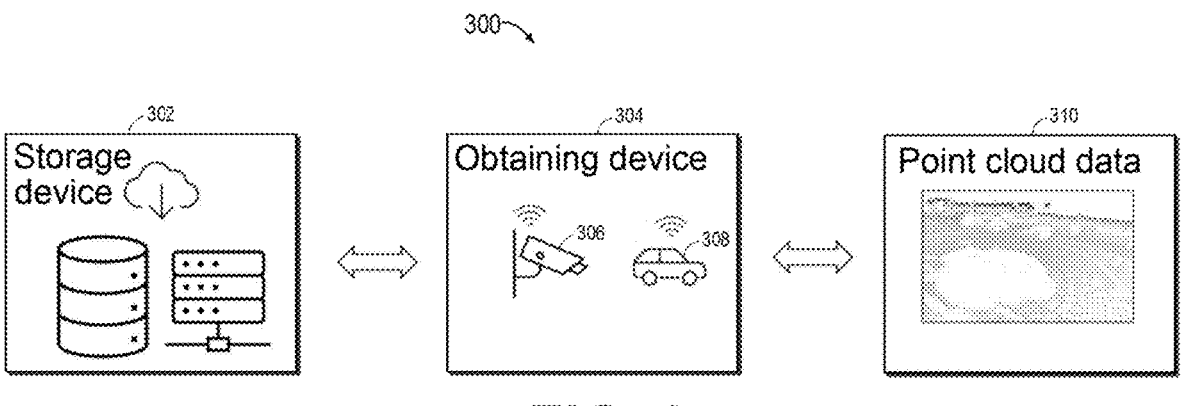
FIG. 3 is a schematic diagram of an example use scenario of point cloud compression according to an embodiment of the present disclosure.

FIG. 3 is a schematic diagram of an example use scenario 300 of point cloud compression according to an embodiment of the present disclosure, taking a traffic system as an example. LiDAR is widely used in vehicles to detect and receive signals from the external world. Due to the use of laser technology to obtain information about the external world in a form of point clouds, LiDAR exhibits highly reliable and robust characteristics under various weather conditions. LiDAR in some contexts needs to scan at a high speed to capture road changes every millisecond, which leads to a huge demand for storage of point cloud data.

As shown in FIG. 3, point cloud data 310 may be point cloud data in traffic scenarios, and the point cloud data 310 in the traffic scenarios may be obtained by using an obtaining device 304. The obtaining device 304 may include a LiDAR probe 306. By installing the LiDAR probe 306 on a vital communication line or intersection, a quantity and driving speeds of vehicles on the road may be monitored in real time, providing accurate point cloud data for a traffic management department. The point cloud data not only helps optimize traffic flow management and reduce traffic congestion, but also provides a strong basis for traffic safety early-warning. In addition, the obtaining device 304 may further include an autonomous vehicle 308, which is typically equipped with a LiDAR device to obtain the point cloud data 310 on the road. For example, a typical intersection point cloud includes approximately 200,000 points, occupying approximately a storage space of 9.4 MB. An FPS (frames per second) rate in some embodiments is at least 5 Hz, which means that 45 MB of data needs to be processed every second and 3786 GB of data needs to be processed every day. Therefore, in practical scenarios such as point cloud obtaining, point cloud processing, point cloud storage, and point cloud access and use, point cloud compression is essential to reduce storage costs, improve transmission efficiency, perform real-time processing, and the like.

When the obtaining device 304 obtains the point cloud data 310, a point cloud compression technology may be used to compress the point cloud data 310 and store the point cloud data in a storage device 302. The storage device 302 is usually provided by a storage service provider that may perform point cloud compression on the point cloud data 310 uploaded by a user before storage. An individual user may remotely access point cloud data through the storage device 302, and the traffic management department may monitor a public transportation system in real time by accessing point cloud data through the storage device. In addition, a third-party enterprise may also access shared point cloud data through the storage device 302 to conduct point cloud data research, develop autonomous driving models, and the like. It should be understood that this scenario is used as an example of a point cloud compression scenario, point cloud compression may also be used in industrial fields, such as robot navigation and obstacle avoidance, as well as safety zone protection and the like. Embodiments of the present disclosure do not limit the use scenarios.

Figure 4:
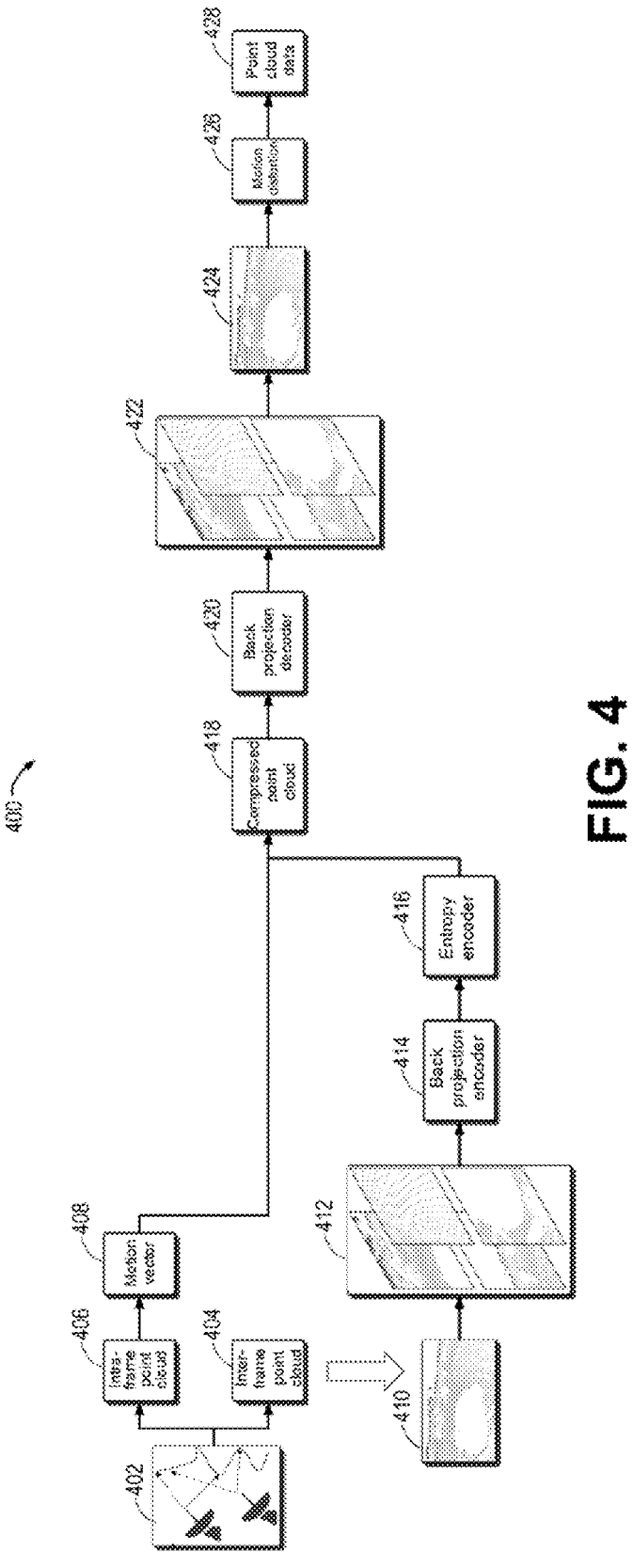
FIG. 4 is a schematic diagram of a process of point cloud compression and reconstruction according to an embodiment of the present disclosure.

FIG. 4 is a schematic diagram of a process 400 for point cloud compression and reconstruction according to an embodiment of the present disclosure. At block 402, point cloud data is sampled to generate an inter-frame point cloud 404 and an intra-frame point cloud 406. For example, a LiDAR on a vehicle may sample point cloud data as the vehicle moves and may perform sparse sampling to sample K point clouds per frame, where K is a sampling rate. In some embodiments, a first quantity of point clouds may be sampled from point cloud frames among the plurality of point cloud frames as the inter-frame point cloud. In some embodiments, a second quantity of point clouds sampled from the point cloud frames may be used as the inter-frame point cloud based on the inter-frame point cloud. In some embodiments, a motion vector associated with the intra-frame point cloud may be generated by comparing the intra-frame point cloud and the inter-frame point cloud of the plurality of point cloud frames.

For example, among the K point clouds, KM point clouds may be selected as inter-frame point clouds explicitly encoded in a spatial domain, and the remaining KN point clouds may be used as intra-frame point clouds. In addition, the inter-frame point clouds may be compared with the intra-frame point clouds to generate a motion vector 408. In some embodiments, the motion vector may be based on a six-degree-of-freedom (6 DoF) viewing angle. For example, in an autonomous driving system, the motion vector may describe position and attitude changes, including motion of six degrees of freedom such as translation and rotation, of the vehicle relative to a reference point cloud frame. This motion vector with the six-degree-of-freedom viewing angle may provide more comprehensive and accurate motion information, which helps achieve more accurate processing and analysis of point cloud data.

The inter-frame point cloud 410 may be an example two-dimensional image of the inter-frame point cloud 404, and a plurality of sampling blocks 412 may be generated by sampling the inter-frame point cloud 410. For example, the farthest point sampling technology may be used to divide the inter-frame point cloud 410 into a plurality of cubes in space. Farthest point sampling is used to select a set of representative points from point cloud data. In some embodiments, an initial point may be randomly selected first, and then a point farthest from the selected point may be selected from the remaining points as a next sampling point. This process is repeated sequentially until a required sampling quantity is reached or a specific sampling condition is met. Farthest point sampling can effectively preserve the structure and feature of an original point cloud, and can minimize redundant information between sampling points as much as possible while maintaining representativeness of the sampling points. A back projection encoder 414 may be used to process the plurality of sampling blocks 412. The back projection encoder 414 is an encoder module of a back projection autoencoder. The back projection encoder 414 and a back projection decoder 420 together form the back projection autoencoder. A specific architecture of the back projection autoencoder will be described in detail with reference to FIG. 5.

The back projection encoder 414 may be used to generate a compressed inter-frame point cloud. Then, an entropy encoder 416 may be used to further compress the compressed inter-frame point cloud. In some embodiments, the entropy encoder may be used to generate bit rate encoding of the compressed inter-frame point cloud. For example, the entropy encoder 416 represents information with a relatively high frequency of occurrence with relatively short encoding, while representing a symbol with a relatively low frequency of occurrence with relatively long encoding, in order to reduce data redundancy and achieve data compression. The entropy encoder may include but is not limited to Huffman encoding and arithmetic encoding, and arithmetic encoders may be integrated into a training process to jointly optimize an entropy of features. Due to non-differentiability of entropy encoding, a differentiable proxy is applied during training. In some embodiments, a quantization step in the entropy encoder may be replaced with additive uniform noise, and a quantity of bits may be estimated as a bit rate loss R. During an inference process, the features are appropriately quantified and compressed through a range encoder. A total loss for optimizing the entropy encoder is shown in Equation (1):

$$L = D + \lambda R \qquad (1)$$

Here, D is a chamfer distance, which is used to measure a difference between a reconstructed point cloud P' and an original point cloud P. R is the bit rate loss, which is used to control a compression rate. A specific point cloud compression rate may be achieved by adjusting the value of R.

A compressed point cloud 418 may include the motion vector 408 and the compressed inter-frame point cloud. For example, obtained point cloud data may be subjected to the above operations to generate the compressed point cloud 418. Because a volume of the compressed point cloud 418 is much smaller than that of the original point cloud data, efficient storage and utilization may be achieved. When the point cloud data is needed, the compressed point cloud may be decoded. The back projection decoder 420 may be used to decode the compressed inter-frame point cloud in the compressed point cloud 418, to generate a decompressed sampling block 422. In addition, a decompressed inter-frame point cloud 424 may be generated by restoring the decompressed sampling block 422, and then a decompressed point cloud data 428 may be generated through motion distortion 426. The decompressed point cloud data 428 is basically consistent with the original point cloud data.

Figure 5:
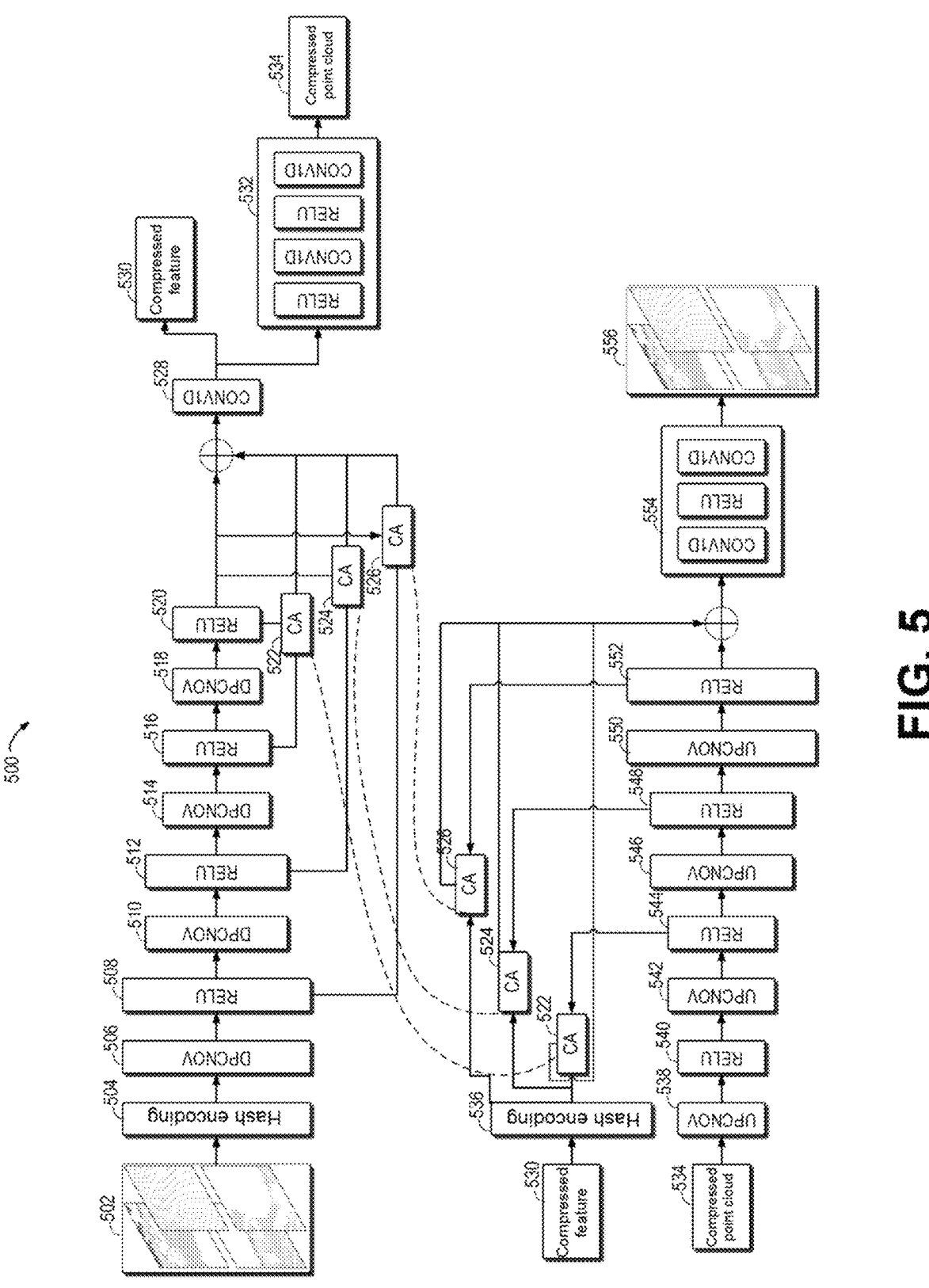
FIG. 5 is a schematic diagram of an architecture of a back projection autoencoder according to an embodiment of the present disclosure.

FIG. 5 is a schematic diagram of an architecture 500 of a back projection autoencoder according to an embodiment of the present disclosure. An embodiment of the present disclosure provides a back projection autoencoder (BPA) including a back projection encoder module and a back projection decoder module. The back projection encoder maps input data to a low dimensional representation in latent space, and the back projection decoder maps this low dimensional representation back to original data space. As shown in FIG. 5, point cloud data 502 (namely, a sampling block of an inter-frame point cloud) may be obtained, and then hash encoding 504 may be generated through a hash encoding technology. The hash encoding technology may be used to generate a projection of the point cloud data 502 into high-dimensional space. A specific process of the hash encoding will be described below with reference to FIG. 7.

Continuing with reference to FIG. 5, after the hash encoding 504 is generated, point cloud data may be dimensionally reduced through a down-sampling convolution (DPConv) layer 506, a DPConv layer 510, a DPConv layer 514, and a DPConv layer 518. For example, dimensions of the DPConv layer 506, the DPConv layer 510, the DPConv layer 514, and the DPConv layer 518 may be respectively 1024, 512, 128, and 16, to reduce the point cloud data from 1024 dimensions to 16 dimensions and achieve point cloud data compression. It should be understood that the dimensions here are only examples, and network layers of other dimensions may also be used. In addition, an activation function layer may be connected after each DPConv layer. For example, an activation function RELU 508, an activation function RELU 512, an activation function RELU 516, and an activation function RELU 520 are used, respectively. It should be understood that use of the activation function RELU here is only an example, and the activation function is not limited in embodiments of the present disclosure.

The back projection encoder further includes a cross-attention (CA) layer 522, a CA layer 524, and a CA layer

526. A CA layer may capture a feature correspondence between previous feature mapping and last feature mapping to achieve feature aggregation and enhancement. Feature mapping may be represented by Equation (2):

$$F = T\left(\frac{Q_{F_y(i)}K_{F_x}^T}{\sqrt{d}}\right)V_{F_y(i)}, \qquad (2)$$

where $$i = 0, 1, 2...$$

Here, $F_y(i)$ is a previous feature, $F_x$ is an output of a latter feature, T represents a softmax operation to calculate an attention score, d represents dimensions of point cloud data, and F is an aggregated feature. The aggregated feature F is input into a one-dimensional convolution (Conv1D) layer 528 to generate a compressed feature 530, and a compressed point cloud 534 is generated through a convolutional module 532 (for example, the compressed inter-frame point cloud 122 shown in FIG. 1).

When it is necessary to decompress (namely, decode) the compressed point cloud 534, hash encoding 536 of the compressed feature 530 may be generated. In addition, during decompression, the same CA layers 522, 524, and 526 are still used to capture a feature correlation between the compressed feature 530 and the compressed point cloud 534. In other words, during encoding and decoding, parameters of the CA layers are shared, which allows a model to project spatial points onto their feature representations. In addition, the compressed point cloud 534 is up-sampled through an up-sampling convolution (UPConv) layer 538, an UPConv layer 542, an UPConv layer 546, and an UPConv layer 550. For example, dimensions of the UPConv layer 538, the UPConv layer 542, the UPConv layer 546, and the UPConv layer 550 may be respectively 16, 128, 512, and 1024. It should be understood that the dimensions here are only examples, and network layers of other dimensions may also be used. In addition, an activation function layer may be connected after each UPConv layer. For example, an activation function RELU 540, an activation function RELU 544, an activation function RELU 548, and an activation function RELU 552 are used, respectively. Then, decompressed point cloud data 556 is generated through a convolutional module 554.

Figure 6:
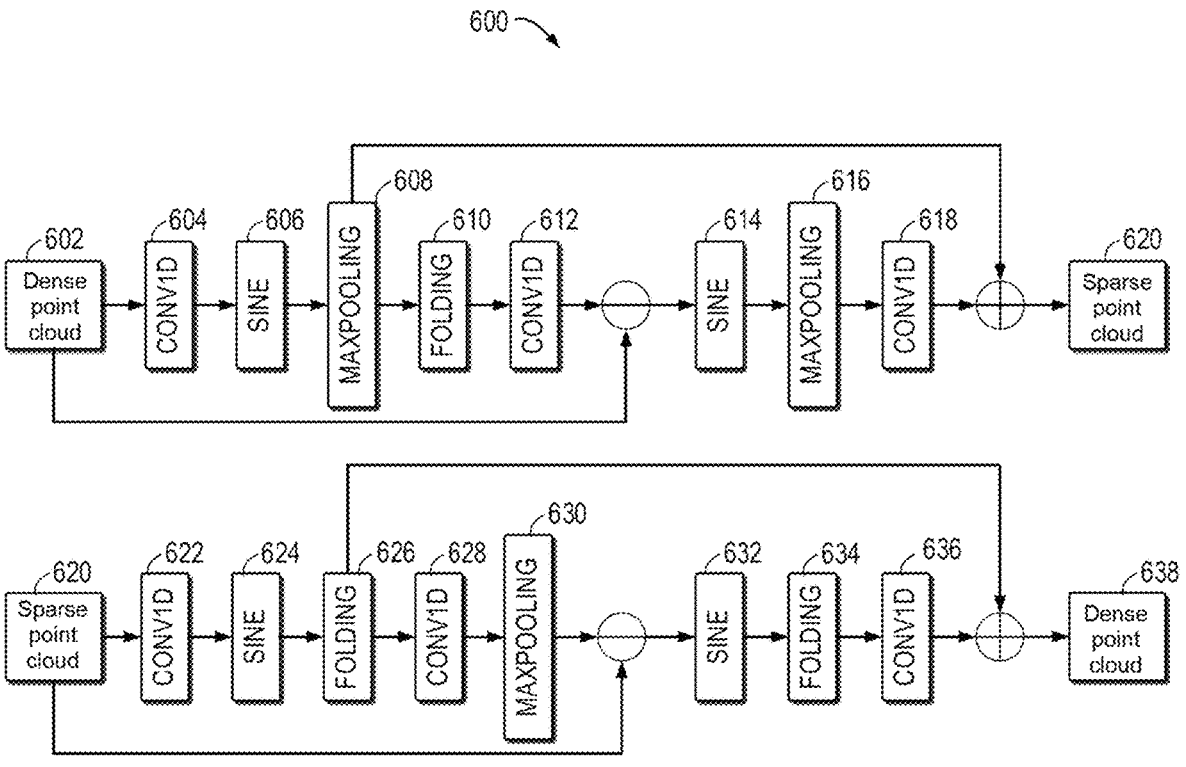
FIG. 6 is a schematic diagram of a detailed architecture of a back projection encoder and a back projection decoder of a back projection autoencoder according to an embodiment of the present disclosure.

FIG. 6 is a schematic diagram of a detailed architecture 600 of a back projection encoder and a back projection decoder of a BPA according to an embodiment of the present disclosure. The back projection encoder is a mirror reflection of the back projection decoder, where a residual between an up-sampled point cloud and a reference truth value should match a residual between their sampled versions. In other words, the back projection encoder updates the up-sampled point cloud by providing feedback on a residual between down-sampled point clouds, to achieve efficient compression and decompression of point cloud data. As shown in FIG. 6, a dense point cloud 602 may be used to generate a residual value with the dense point cloud 602 through a one-dimensional convolution (Conv1D) layer 604, and then through an activation function Sine 606, a maxpooling layer 608, a folding layer 610, and a Conv1D layer 612, and then generate a sparse point cloud 620 through an activation function Sine 614, a maxpooling layer 616, and a Conv1D layer 618. The above process may be represented by Equation (3):

$$P_s = D(P) + D(P - U(D(P))) \qquad (3)$$

Here, D and U are respectively a down-sampling operation and an up-sampling operation, which are respectively processed by a maxpooling layer and a folding layer.

The sparse point cloud 620 may be used to generate a residual value with the sparse point cloud 620 through a Conv1D layer 622, an activation function Sine 624, a folding layer 626, a Conv1D layer 628, and a maxpooling layer 630, and then generate a dense point cloud 638 through an activation function Sine 632, a folding layer 634, and a Conv1D layer 636. The above process may be represented by Equation (4):

$$P' = U(P_s) + U(P_s - D(U(P_s))) \qquad (4)$$

Here, D and U are respectively a down-sampling operation and an up-sampling operation. A design strategy of the back projection encoder and the back projection decoder can effectively process large-scale point cloud data and maintain accuracy and quality of point cloud data during compression and decompression processes.

Figure 7:
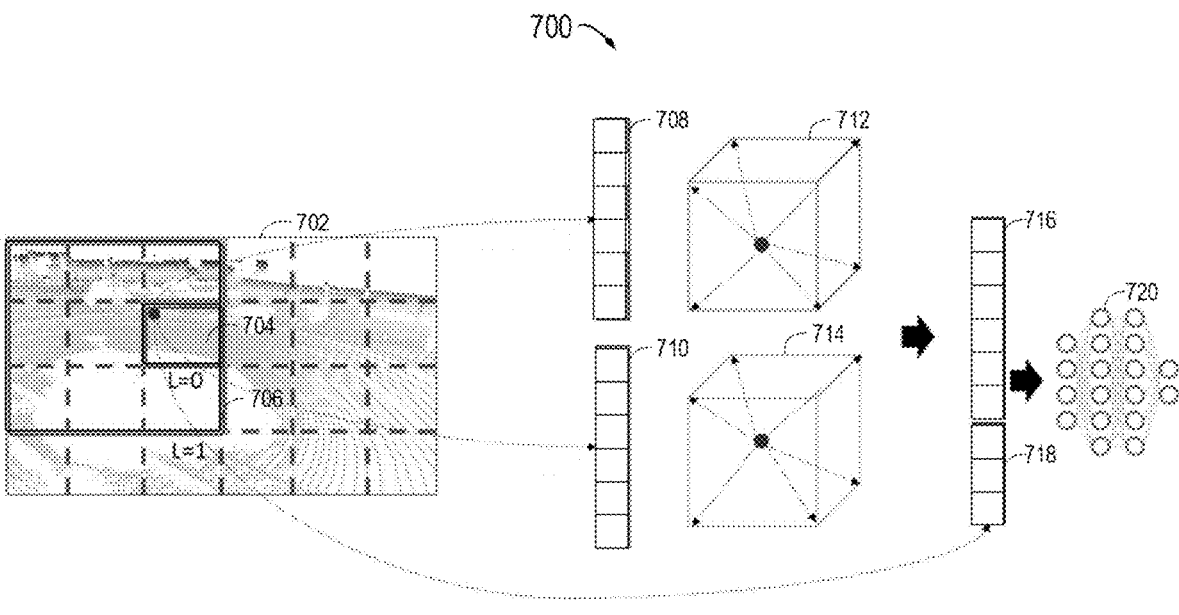
FIG. 7 is a schematic diagram of a process of hash encoding according to an embodiment of the present disclosure.

FIG. 7 is a schematic diagram of a process 700 of hash encoding according to an embodiment of the present disclosure. As mentioned above, the hash encoding is used in both a back projection encoder and a back projection decoder to encode a dense point cloud and a compressed point cloud. A multi-resolution grid is used to interpolate point cloud data, so that three-dimensional coordinates are projected into higher dimensional space. As shown in FIG. 7, point cloud data 702 may be divided into layers of different resolution. For example, the point cloud data 702 includes a grid 704 with resolution of L=0 and a grid 706 with resolution of L=1. After division of most precise resolution and most rough resolution is determined, resolution of an intermediate layer is calculated through an equal ratio series. Then, grids of different layers are mapped to a corresponding hash table. In some embodiments, a plurality of coordinates of a plurality of point clouds in an inter-frame point cloud may be obtained. For example, coordinates of a point cloud corresponding to the grid 704 are converted to an index of a hash table 708, and coordinates of a point cloud corresponding to the grid 706 are converted to an index of a hash table 710. Equation (5) and Equation (6) for generating hash indexes are as follows:

$$enc(x) = \left(\bigoplus_{i=1}^{d} x_i\pi_i\right) \bmod T \qquad (5)$$

$$h(x) = \sum_{i=0}^{L} w_i \cdot enc(x), \qquad (6)$$

where $$w_i = x \cdot N_l - \lfloor x \cdot N_l \rfloor$$

Here, $x_i$ is an $i^{th}$ point cloud, d represents dimensions of point cloud data, $\oplus$ represents a bitwise XOR operation, $\pi_i$ is a unique prime number, T is a maximum entry at each resolution (namely, a size of a hash table), l is a level of resolution, and $N_l$ is a grid of an $l^{th}$ hash. Based on a spatial hash function, three-dimensional coordinates may be encoded into hash encoding of $2^l$ dimensions for calculation.

In some embodiments, an interpolation operation may be performed on the inter-frame point cloud through the multi-resolution grid to generate a hash encoding of the inter-frame point cloud. For example, values of eight points around a target value are found in hash tables of different resolution, and then trilinear interpolation is performed. For example, the values of the eight points around the target value are separately found through a cube 712 and a cube 714. Then, interpolation 716 and interpolation 718 are spliced to be input into a network 720. The hash encoding and the multi-resolution grid enable more efficient processing of point cloud data, to achieve a better compression effect and a higher data expression capability.

Figure 8:
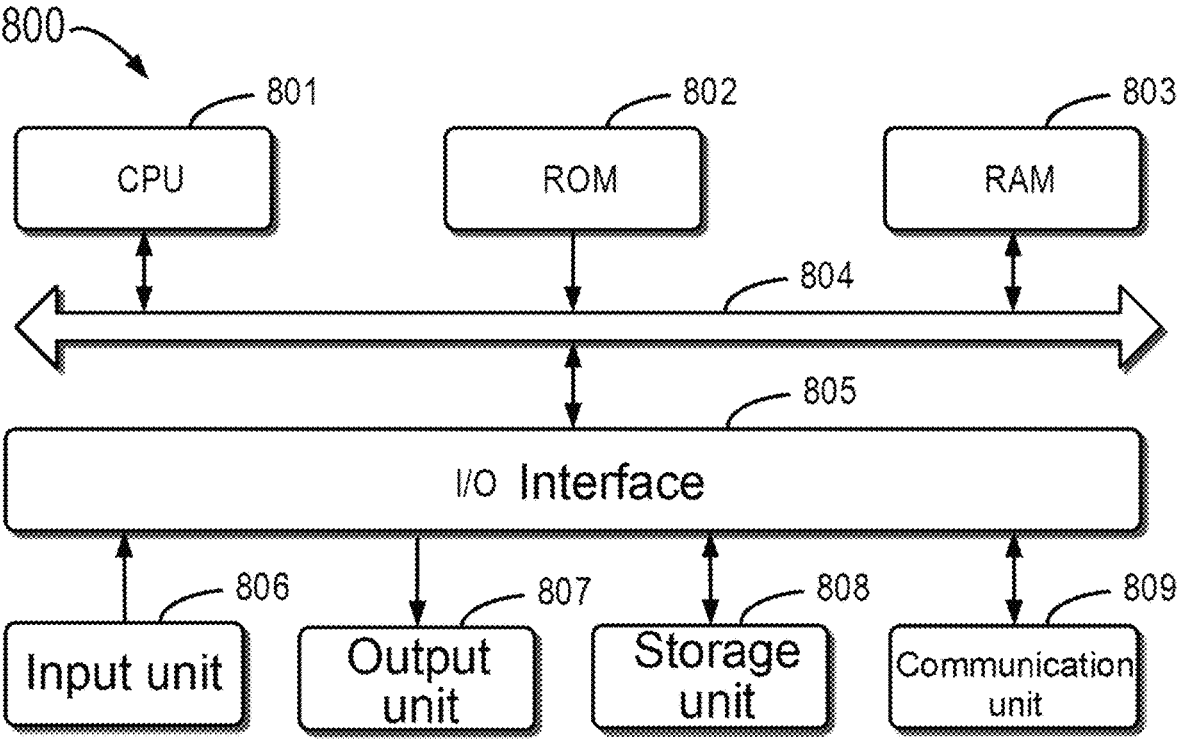
FIG. 8 is a block diagram of a device that may be configured to implement embodiments of the present disclosure.

FIG. 8 is a block diagram of a device 800 that may be configured to implement embodiments of the present disclosure. The device 800 may be the device or apparatus described in embodiments of the present disclosure. As shown in FIG. 8, the device 800 includes a central processing unit (CPU) 801, which may execute various appropriate actions and processing in accordance with computer program instructions stored in a read-only memory (ROM) 802 or computer program instructions loaded onto a random access memory (RAM) 803 from a storage unit 808. Various programs and data required for operations of the device 800 may also be stored in the RAM 803. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; the storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The various methods or processes described above may be performed by the CPU 801. For example, in some embodiments, the method 200 may be implemented as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded onto the RAM 803 and executed by the CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions, so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can be loaded onto a computer, another programmable data processing apparatus, or another device, so that a series of operating steps are performed on the computer, another programmable data processing apparatus, or another device to produce a computer-implemented process. Therefore, the instructions executed on the computer, another programmable data processing apparatus, or another device implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of the instruction including one or more executable instructions for implementing specified logical functions. In some alternative implementations, the functions denoted in the blocks may also occur in an order different from that denoted in the drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of a dedicated hardware and computer instructions.

Various embodiments of the present disclosure have been described above. The above descriptions are illustrative, rather than exhaustive, and are not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:
generating an intra-frame point cloud and an inter-frame point cloud based on point cloud data that includes a plurality of point cloud frames;
generating a motion vector associated with the intra-frame point cloud based on the intra-frame point cloud and the inter-frame point cloud;
generating a compressed inter-frame point cloud based on the inter-frame point cloud by using an encoder module of an autoencoder network, wherein the encoder module comprises a plurality of down-sampling convolution layers for compression and a plurality of cross-attention layers for capturing a correlation between the plurality of point cloud frames; and
generating compressed point cloud data based on the motion vector and the compressed inter-frame point cloud.

2. The method according to claim 1, wherein generating the compressed inter-frame point cloud by using the encoder module of the autoencoder network comprises:
interpolating the inter-frame point cloud through a multi-resolution grid to generate a hash encoding of the inter-frame point cloud; and generating the compressed inter-frame point cloud based on the hash encoding of the inter-frame point cloud by using the plurality of down-sampling convolution layers.

3. The method according to claim 2, further comprising:
generating bit rate encoding of the compressed inter-frame point cloud by using an entropy encoder.

4. The method according to claim 2, wherein generating the hash encoding of the inter-frame point cloud comprises:
obtaining a plurality of coordinates of a plurality of point clouds in the inter-frame point cloud; and
generating the hash encoding of the inter-frame point cloud by performing XOR operations on the plurality of coordinates and a unique prime number.

5. The method according to claim 1, further comprising:
obtaining the motion vector and the compressed inter-frame point cloud from the compressed point cloud data;
generating a decompressed inter-frame point cloud based on the compressed inter-frame point cloud by using a decoder module of the autoencoder network, wherein the decoder module comprises a plurality of up-sampling convolution layers for decompression and a plurality of cross-attention layers; and
generating decompressed point cloud data based on the motion vector and the decompressed inter-frame point cloud.

6. The method according to claim 5, wherein generating the decompressed inter-frame point cloud by using the decoder module of the autoencoder network comprises:
interpolating the compressed inter-frame point cloud through a multi-resolution grid to generate a hash encoding of the compressed inter-frame point cloud; and
generating the decompressed inter-frame point cloud based on the hash encoding of the compressed inter-frame point cloud by using the plurality of up-sampling convolution layers.

7. The method according to claim 6, wherein the plurality of cross-attention layers of the decoder module share weights with the plurality of cross-attention layers of the encoder module.

8. The method according to claim 1, wherein generating the intra-frame point cloud and the inter-frame point cloud comprises:
sampling a first quantity of point clouds from point cloud frames among the plurality of point cloud frames as the inter-frame point cloud; and
using a second quantity of point clouds sampled from the point cloud frames as the inter-frame point cloud based on the inter-frame point cloud.

9. The method according to claim 8, wherein generating the motion vector associated with the intra-frame point cloud comprises:
generating the motion vector associated with the intra-frame point cloud by comparing the intra-frame point cloud and the inter-frame point cloud of the plurality of point cloud frames.

10. The method according to claim 9, wherein the motion vector is based on a six-degree-of-freedom viewing angle.

11. An electronic device, comprising:
at least one processor; and
memory coupled to the at least one processor and having instructions stored therein, wherein the instructions, when executed by the at least one processor, cause the electronic device to perform actions comprising:

generating an intra-frame point cloud and an inter-frame point cloud based on point cloud data that includes a plurality of point cloud frames;

generating a motion vector associated with the intra-frame point cloud based on the intra-frame point cloud and the inter-frame point cloud;

generating a compressed inter-frame point cloud based on the inter-frame point cloud by using an encoder module of an autoencoder network, wherein the encoder module comprises a plurality of down-sampling convolution layers for compression and a plurality of cross-attention layers for capturing a correlation between the plurality of point cloud frames; and generating compressed point cloud data based on the motion vector and the compressed inter-frame point cloud.

12. The electronic device according to claim 11, wherein generating the compressed inter-frame point cloud by using the encoder module of the autoencoder network comprises:

interpolating the inter-frame point cloud through a multi-resolution grid to generate a hash encoding of the inter-frame point cloud; and generating the compressed inter-frame point cloud based on the hash encoding of the inter-frame point cloud by using the plurality of down-sampling convolution layers.

13. The electronic device according to claim 12, wherein the actions further comprise:

generating bit rate encoding of the compressed inter-frame point cloud by using an entropy encoder.

14. The electronic device according to claim 12, wherein generating the hash encoding of the inter-frame point cloud comprises:

obtaining a plurality of coordinates of a plurality of point clouds in the inter-frame point cloud; and generating the hash encoding of the inter-frame point cloud by performing XOR operations on the plurality of coordinates and a unique prime number.

15. The electronic device according to claim 11, wherein the actions further comprise:

obtaining the motion vector and the compressed inter-frame point cloud from the compressed point cloud data;

generating a decompressed inter-frame point cloud based on the compressed inter-frame point cloud by using a decoder module of the autoencoder network, wherein the decoder module comprises a plurality of up-sampling convolution layers for decompression and a plurality of cross-attention layers; and generating decompressed point cloud data based on the motion vector and the decompressed inter-frame point cloud.

16. The electronic device according to claim 15, wherein generating the decompressed inter-frame point cloud by using the decoder module of the autoencoder network comprises:

interpolating the compressed inter-frame point cloud through a multi-resolution grid to generate a hash encoding of the compressed inter-frame point cloud; and generating the decompressed inter-frame point cloud based on the hash encoding of the compressed inter-frame point cloud by using the plurality of up-sampling convolution layers.

17. The electronic device according to claim 16, wherein the plurality of cross-attention layers of the decoder module share weights with the plurality of cross-attention layers of the encoder module.

18. The electronic device according to claim 11, wherein generating the intra-frame point cloud and the inter-frame point cloud comprises:

sampling a first quantity of point clouds from point cloud frames among the plurality of point cloud frames as the inter-frame point cloud; and using a second quantity of point clouds sampled from the point cloud frames as the inter-frame point cloud based on the inter-frame point cloud.

19. The electronic device according to claim 18, wherein generating the motion vector associated with the intra-frame point cloud comprises:

generating the motion vector associated with the intra-frame point cloud by comparing the intra-frame point cloud and the inter-frame point cloud of the plurality of point cloud frames.

20. A computer program product comprising a non-transitory computer-readable medium having machine-executable instructions stored therein, wherein the machine-executable instructions, when executed by a machine, cause the machine to perform actions comprising:

generating an intra-frame point cloud and an inter-frame point cloud based on point cloud data that includes a plurality of point cloud frames;

generating a motion vector associated with the intra-frame point cloud based on the intra-frame point cloud and the inter-frame point cloud;

generating a compressed inter-frame point cloud based on the inter-frame point cloud by using an encoder module of an autoencoder network, wherein the encoder module comprises a plurality of down-sampling convolution layers for compression and a plurality of cross-attention layers for capturing a correlation between the plurality of point cloud frames; and generating compressed point cloud data based on the motion vector and the compressed inter-frame point cloud.

* * * * *